United States Patent [19]

Gilson et al.

[11] Patent Number: 5,210,131

[45] Date of Patent: May 11, 1993

[54] METHOD OF MAKING ORGANOPOLYSILOXANES

[75] Inventors: Jean-Marc Gilson, Sombreffe; Jean de la Croi Habimana, Soignies, both of Belgium

[73] Assignee: Dow Corning S.A., Seneffe, Belgium

[21] Appl. No.: 832,145

[22] Filed: Feb. 6, 1992

[30] Foreign Application Priority Data

Feb. 21, 1991 [GB] United Kingdom ............... 9103666

[51] Int. Cl.$^5$ ............................................. C08L 83/04
[52] U.S. Cl. ....................................... 524/863; 528/14; 528/15; 528/16; 528/17; 528/18; 528/19; 528/21; 528/23
[58] Field of Search ............... 528/21, 23, 14, 15, 528/16, 17, 18, 19; 524/863

[56] References Cited

U.S. PATENT DOCUMENTS 3,449,091  6/1969  Nichols .............................. 423/302
3,549,680  12/1970  Wegehaupt et al. ............. 260/448.2
4,902,813  2/1990  Wegehaupt et al. ............... 556/459

FOREIGN PATENT DOCUMENTS 765744   1/1957  United Kingdom .
910513  11/1962  United Kingdom .

*Primary Examiner*—Melvyn I. Marquis
*Attorney, Agent, or Firm*—Roger H. Borrousch

[57] ABSTRACT

A method of making organopolysiloxanes comprises contacting organosilicon compounds having at least one unit $$R_a^\circ SiO_{\frac{4-a}{2}},$$

wherein $R^\circ$ is hydrogen, hydroxyl, a $C_{1-18}$ hydrocarbon, substituted hydrocarbon or hydrocarbonoxy group and a has a value of from 0 to 4 with a phosphonitrile halide AB, wherein A is a phosphonitrile halide cation $[X(PX_2=N)_nPX_3]^+$, wherein X is halide and n is from 1 to 8 and B is an anion derived from a Lewis acid not containing a P atom, e.g. $[MX_{(v-t+1)}R^2{}_t]^-$. The method is particularly useful for condensation of silanol end-blocked siloxanes.

21 Claims, No Drawings

METHOD OF MAKING ORGANOPOLYSILOXANES

This invention relates to a method of making organopolysiloxanes, more specifically a method of making organopolysiloxanes of a high viscosity by polymerisation of lower viscosity materials in the presence of a specified catalyst.

The production of organopolysiloxanes by polymerisation or copolymerisation of relatively low molecular weight organosiloxanes has been known for some time and is a well known step in the production of commercial siloxanes. Organopolysiloxanes have also been prepared by contacting low viscosity organosiloxanes, especially cyclic polysiloxanes, low viscosity siloxanols or a mixture thereof in the presence of an acidic or basic catalyst. For example organopolysiloxanes may be prepared by condensation of organosiloxanes having reactive groups at terminal silicon atoms, e.g. silicon-bonded hydroxyl groups, silicon-bonded hydrocarbonoxy groups and mixtures of one or more of these. Organopolysiloxanes may also be made by rearrangement of linear and/or cyclic organosiloxanes. For each of the polymerisation processes catalysts have been developed, and some are more effective than others. These include sulphuric acid, hydrochloric acid, Lewis acids, sodium hydroxide, potassium hydroxide, tetramethylammonium hydroxide, tetrabutylphosphonium silanolate and amines.

A number of patent applications discloses catalysts which are based on phosphonitrile halides. G.B. Patent Specification 765 744 discloses that preferred phosphonitrile halides for the polymerisation of liquid organosiloxanes having an average degree of substitution of from 1.9 to 2.1 organic groups attached to silicon per silicon atom are polymeric chlorides represented by the formula $(PNCl_2)_n$ wherein n is an integer of at least 3, most preferably 3 to 6. The process is described as being especially valuable for the production of polymerised organosiloxanes to be used for the manufacture of silicone rubber.

G.B. Patent Specification 910 513 discloses the use of phosphonitrile halides in a process for the manufacture of stabilised high viscosity organopolysiloxane oils, which comprises preparing a fluid mixture of the halides with a hydroxyl-terminated diorganopolysiloxane and a triorganosilyl end-blocked diorganopolysiloxane with a viscosity from 1 to 10000mm²/s, followed by bringing the mixture in contact with a stream of air at room temperature, until the viscosity is stabilised and thereafter bringing the mixture in contact with a stream of air at a temperature of from 100 to 200° C. until the viscosity is stabilised.

In U.S. Pat. No. 3,549,680 phosphonitrile halide catalysts are employed in rearrangement reactions, e.g. a method of preparing organohalogenosilicon compounds in which organohalogenosiloxane compounds containing at least one halogen atom bonded to silicon per molecule and organosiloxanes free from halogen substituents having a viscosity of less than 100,000mm²/s are mixed with the halides.

E.P. Patent Specification 319,978 describes the use of chlorophosphonitrile catalysts in a process for the preparation of diorganopolysiloxanes containing a silicon-bonded hydroxyl group in each of the terminal units, in which a cyclic diorganopolysiloxane and/or diorganochlorosilane hydrolysis product is reacted with a diorganochlorosilane, followed by the treatment with water or an aqueous solution and separating the low boiling substituents and the aqueous phase.

There is a continuing search for improved catalysts for producing organopolysiloxanes.

We have now found that if phosphonitrile catalysts are used which include certain Lewis acid-based parts an improved process for making organopolysiloxanes is obtained.

According to the invention there is provided a method of making organopolysiloxanes which comprises contacting one or more organosilicon compounds having at least one unit the general formula

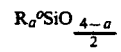

(1) wherein R° denotes a hydrogen atom, a hydroxyl group, a hydrocarbon group having from 1 to 18 carbon atoms, a substituted hydrocarbon group having from 1 to 18 carbon atoms or a hydrocarbonoxy group having up to 18 carbon atoms and a has a value of from 0 to 4 with a phosphonitrile halide catalyst which has the general formula AB (2), wherein A is a phosphonitrile halide cation of the general formula $[X(PX_2=N)_nPX_3]^+$ (3), wherein X denotes a halide atom and n has a value of from 1 to 8 and B is an anion derived from a Lewis acid not containing a P atom.

Organosilicon compounds which are useful in the method of the invention comprise silanes and polymeric siloxanes. Preferably siloxanes are used which may be linear, branched or cyclic siloxanes or a mixture thereof. In the organosilicon compounds which are used in the method of the invention R° substituents may be hydrogen, hydroxyl, alkyl, e.g. methyl, ethyl, propyl, isobutyl, hexyl, dodecyl or octadecyl, alkenyl, e.g. vinyl, allyl, butenyl, hexenyl or decenyl, alkynyl, e.g. propargyl, aryl, e.g. phenyl, aralkyl, e.g. benzyl, alkaryl, e.g. tolyl or xylyl, alkoxy, e.g. methoxy, ethoxy or butoxy, aryloxy, e.g. phenoxy, substituted groups, e.g. trifluoropropyl, chloropropyl or chlorophenyl. Where siloxanes are used it is preferred that at least 80% of all R° groups are alkyl or aryl groups, more preferably methyl groups. Most preferably substantially all R° groups are alkyl or aryl groups, especially methyl groups. It will be clear to a person skilled in the art that by having R° groups which are other hydrocarbon or hydrocarbonoxy groups, organopolysiloxanes may be produced which have such other groups in pendant or terminal positions along the siloxane chain. This would be useful e.g. in making vinyl, alkoxy or fluoro functional organo-polysiloxanes. Preferably R° only denotes a hydroxyl group in silanes and in terminal units of linear siloxanes.

Where siloxanes are used, they are preferably those in which the value of a is 2 for the majority of units (1) and more preferably for practically all units (1), except for endblocking units. Thus linear or slightly branched organopolysiloxanes may be produced. Examples of suitable organosilicon compounds include silanes, e.g. alkoxy functional silanes and silanols such as trimethyl silanol, trimethylmethoxysilane, methyltrimethoxysilane. They also include siloxanes e.g. trimethylsiloxane endblocked polydimethylsiloxanes, dimethylsilanol endblocked polydimethyl siloxanes, trimethylsiloxane endblocked dimethyl methylphenyl siloxane, cyclic siloxanes, e.g. octamethyl cyclotetrasiloxane and decamethyl cyclopentasiloxane. If silanes are used it is preferred that at least one of the silicon-bonded substituent is a hydroxyl group or a hydrocarbonoxy group, which will make the silanes suitable for polymerisation by condensation reaction.

Phosphonitrile halide compounds, which are useful as a catalyst in the method of the invention, are known materials but their use as a catalyst has not been suggested.

Metal halide modified phosphonitrile chloride polymeric compositions have been described e.g. in U.S. Pat. No. 3,449,091. It discloses materials having the general formula $[Cl[PCl_2=N]_nPCl_3]^+[EX_{(v+1)}]^-$, wherein E is an element having an electronegativity value of from 1.2 to 2 and differs in electronegativity from the halogen portion of the halide by a maximum of 2.5, X is a halogen, v is the valence of element E and is from 1 to 10 inclusive. Exemplified E elements include Zn, Al, B, Ti, Sn, Sb, Th and Fe.

Suitable phosphonitrile compounds for use in the method of the invention have a cationic phosphonitrile part (A) and an anionic part (B) which has been derived from a Lewis acid. The phosphonitrile part (A) is a linear oligomeric or polymeric phosphonitrile halide. It has the general formula $[X(PX_2=N)_nPX_3]^+(3)$, wherein X denotes a halide and D denotes an integer having a value of from 1 to 8. It is preferred that the halogen X is a chlorine atom. Phosphonitrile halide cationic parts with a value for n which is higher than 8 are less suitable as catalysts. Most preferred are the phosphonitrile halide parts in which the value of n is from 2 to 4. Phosphonitrile halide catalyst wherein the value of D is only 1 are very reactive, but they tend to be insoluble in the reagents and in most common solvents. Unless a suitable commercially acceptable solvent is selected, it is preferred to avoid those catalyst species where n=1. It is sometimes difficult to separate the polymeric phosphonitrile halides having different n values and mixtures may be used. It is particularly preferred that the amount of phosphonitrile halide polymer, in which n has a value of 2, is as high as possible as this gives the most active catalyst. Particularly preferred is a catalyst which exclusively consists of compounds according to the invention in which the value of n is 2.

The anionic part of the catalyst is derived from a Lewis acid and preferably has the formula $]MX_{(v-t+1)}R^2{}_t]^-(4)$, wherein M denotes an element with a value of electronegativity on Pauling's scale of from 1.0 to 2.0, $R^2$ is an alkyl group having up to 12 carbon atoms, v is the valence or oxidation state of the element M and $0<t<v$. Although it is preferred that the value of t is zero alkyl groups may be included. Preferably the Lewis acid based anion contains a halide X which is the same as the halide of the phosphonitrile cationic part, i.e. most preferably a chlorine. The element M of the Lewis acid part is an electropositive element having an electronegativity value according to Pauling's scale of from 1 to 2, preferably from 1.2 to 1.9, most preferably 1.5 to 1.9. Suitable elements are found in Groups Ib, IIa, IIb, IIIa, IVa, IVb, Va, Vb, VIb, VIIb and VIII of the Periodic Table. They include Al, B, Be, Mg, Sb and Si.

It is preferred that the difference in electronegative value between the phosphorus atom in Part A of the catalyst and the M element is as large as possible within the preferred range, giving improved catalytic activity when this value is larger. The presence of the anionic Lewis acid based part in the catalyst improves the catalytic activity of the catalyst in the polymerisation reaction of organosiloxanes. It also tends to make the catalyst more stable in itself thus preventing it from cyclisation and from polymerisation with other phosphonitrile compounds, even at higher temperatures.

A suitable compound is the one where the Lewis acid derived portion is based on antimony, especially $SbCl_3$ or $SbCl_5$. An example of such suitable catalyst has the formula $[Cl_3P=N-(PCl_2=N)_s-PCl_3]^+[SbCl_6]^-$, wherein s has a value from 1 to 4. Another suitable compound is the one where the Lewis acid derived portion is based on Al, especially $AlCl_3$.

Phosphonitrile halide catalysts which are useful in the method of the invention may be made by reacting in the presence of an aromatic or of a chlorinated aliphatic or aromatic hydrocarbon, e.g. toluene symtetrachloroethane or 1,2,4-trichlorobenzene, as inert solvent, a phosphorus pentahalide, e.g. phosphorus pentachloride, an ammonium halide, e.g. ammonium chloride and a selected Lewis acid. The reaction may suitably be carried out at a temperature between 100 and 220° C. followed by separating the reaction products from the solids and the volatile components, thus isolating the liquid reaction product. At temperatures below 100° C. the reaction does not occur or is so slow as to be economically not feasible. Mere mixtures of the reagents do not give satisfactory polymerisation rates. Temperatures above 220° C. may be used provided that pressure is applied to maintain the solvent in the system; however, temperatures above 220° C. are not recommended because of the tendency of the products to darken at elevated temperatures. Preferred temperature range is the refluxing temperature of the inert solvent used in the reaction, for example 120 to 160° C.

The reagents may be contacted for a period of time which may vary from 2 to 10 hours. It is preferred to continue the reaction for a period in excess of 6 hours. It is preferred to react the reagents till a fair amount of the phosphonitrile halides produced are oligomers with more than 2 units. This can be observed easily as phosphonitrile halide dimers are not soluble in the solvents. If the remaining reaction product contains dimers it is preferred that these dimers are separated and refluxed in a solvent in order to be transformed into higher oligomers, preferably in the presence of traces of ammonium halide. Preferably the reaction conditions are adapted to provide a high level of linear trimers and tetramers. The yield of linear phosphonitrile halides versus cyclic phosphonitrile halides can be increased by using a stoichiometric excess of phosphorus halide, which is the preferred method. From 0.1 to 1 mole, preferably 0.3 to 0.6 mole, of the selected Lewis acid is provided for each mole of phosphorus pentahalide.

Representative chlorinated aliphatic or aromatic hydrocarbons that are inert solvents and can be used in the present invention include symmetric tetrachloroethane, monochlorobenzene, o-dichlorobenzene and 1,2,4-trichlorobenzene. The amount of chlorinated hydrocarbon used as solvent seems not to be critical, provided a sufficient amount is used to dissolve at least a portion of the solid reactants, i.e. phosphorus pentahalide and ammonium halide. Of course the reaction rate improves substantially when a significant portion of the solid reactants is in solution. The use of large quantities of solvent is not recommended because of the necessity of subsequent removal of the solvent from the reaction product.

The manner of recovering the desired modified phosphonitrile halide polymeric composition is not critical. If any solid material is present in the reaction mixture it may be removed by any conventional method, e.g. hot filtration, decantation, centrifugation etc. The volatile materials, e.g. the solvent, may be also removed by conventional methods, e.g. distillation. A preferred method of recovering the catalyst includes the removal of the reaction solvent and the addition of a solvent in which only the most preferred compounds are soluble, e.g. dichloromethane. Other compounds can then be filtered off. The catalyst can be conveniently stored in solvent, preferably under a blanket of nitrogen. Concentrations of the catalyst in solvent may range from 1 to 50% by weight. Preferably from 5 to 20% as this facilitates its use in polymerisation processes.

In the method of the invention the catalyst may be used at a concentration of from 1 to 500ppm by weight based on the total weight of the organosilicon compounds. Preferably from 5 to 150ppm by weight are used, most preferably from 5 to 50. The amount of catalyst used in the method of the invention may be reduced when the temperature at which the organosilicon compounds and the catalyst are contacted is increased. The method of the invention may conveniently be carried out at room temperature. The temperature may also be as high as 250° C. Preferably, however, the temperature range is from 20 to 150° C., most preferably from 50 to 120° C.

It is preferred that the method of the invention includes the neutralisation of the catalyst as this will ensure the stability of the organopolysiloxanes which have been produced. Traces of catalyst which are not neutralised may cause the organopolysiloxanes to condense even further, thus increasing the viscosity of the materials. Alternatively the presence of traces of catalysts which have not been neutralised may cause the organopolysiloxanes to re-equilibrate, thus reducing the viscosity of the materials. The neutralisation may be done at any stage of the method of the invention, e.g. as soon as the desired viscosity of the organopolysiloxanes is reached. Neutralisation agents for the catalysts are alkaline materials, preferably lightly alkaline materials e.g. primary, secondary or tertiary amines, cyclic diamines, amides and imides. Examples of suitable neutralisation agents are diethylamine, propylamine, ammonia and hexamethyldisilazane, tributylamine, methylmorpholine, piperazine, trisooctylamine, succinamide and succinimide.

The method of the invention allows the formation of organopolysiloxanes which are purely linear materials as well as the formation of branched organopolysiloxanes. The method also allows for the formation of unreactive organopolysiloxanes, e.g. linear trialkylsiloxane endblocked polydialkylsiloxanes, as well as the formation of reactive organopolysiloxanes, e.g. those having terminal siliconbonded hydroxyl groups. Organopolysiloxanes which are made according to the method of the invention preferably have the general formula $R°[R^1_2SiO]_pSiR^1_2R°$ (5), wherein $R°$ is as defined above, $R^1$ denotes the same groups as $R°$ apart from hydroxyl groups and p is an integer. It is possible to include units of the formula $R^1SiO_{3/2}$ (6) and units of the formula $SiO_{4/2}$ (7) into the organopolysiloxanes, causing a certain amount of branching in the polymer.

Different types of organosilicon compounds may used in the method of the invention. It is preferred that the organosilicon compounds which are used are dried, in the sense that any traces of water would be removed. The better the drying, the better the polymerisation reaction will go. For example the method of the invention may be a method of making organopolysiloxanes as defined above by a condensation reaction. This comprises reacting organosilicon compounds of the general formula $HO-[R^1_2SiO]2q—H$ (8), wherein $R^1$ is as defined above and q denotes an integer which is substantially smaller than p in formula (5), in the presence of a phosphonitrile halide catalyst of the general formula AB as defined above. The organosilicon compounds of formula (8) are known in the art and are commercially available materials which have been described in the literature in great detail. The value of g may be as low as 2, but is preferably sufficient to give the organosiloxane a viscosity of at least 50mm²/s. There is no upper limit for the value of g, as long as the organosiloxane is still liquid at the temperature at which the reaction is carried out. It is, however, preferred for the method of the invention to keep the value of g sufficiently low to facilitate efficient agitation of the reaction mixture. The preferred viscosity range for such organosilicon compounds (8) is from 20 to 500mm²/s, most preferably from 50 to 200mm²/s.

It is possible to include in the method of the invention reagents which will act as endblockers of the organopolysiloxanes, resulting in organopolysiloxanes of the formula (5), wherein all $R°$ groups will be $R^1$ groups. Such endblockers are silanes or short chain polysiloxanes having one terminal hydrolysable group, e.g. silicon-bonded hydroxyl or alkoxy groups, or compounds with 2 silicon atoms, linked by an atom which allows the splitting of the molecule in order to make available silicon-bonded hydrolysable groups, e.g. trimethylsilyl endblocked disiloxane and trimethylsilyl endblocked disilazane. Suitable end-blockers include $R^1_3SiOH$, $HO(R^1_2SiO)_aSiR^1_3$, wherein a has a value of from 2 to 10, $(R^1_3Si)_2O$ and $(R^1_3NH$.

It is also possible to perform the polymerisation reaction as described above, thus introducing e.g. aliphatically unsaturated silicon-bonded groups, for example $Si—CH=CH_2$. The reaction product may then be further reacted in the presence of a suitable catalyst with compounds having silicon-bonded hydrogen atoms. Suitable catalysts for such hydrosilylation reactions are well known in the art and include e.g. Pt compounds and complexes.

Alternatively organopolysiloxanes may be made according to the method of the invention by an equilibration reaction. In this case the method of making organopolysiloxanes as defined above comprises contacting organosilicon compounds of the general formula $R^1[R^1_2SiO]_gSiR^1_3$ (9) and/or organosilicon compounds of the general formula $[R^1_2SiO]_s$ (10) wherein $R^1$ is as defined above and s denotes an integer with a value of from 3 to about 10 and q denotes an integer which is substantially smaller than p in formula (5) with a phosphonitrile halide catalyst of the general formula AB as defined above. Organosilicon compounds of the general formulae (9) and (10) are also well known and commercially available materials, and have been described in great detail in many publications.

By incorporating fillers in the reagents it is possible to make compositions which comprise organopolysiloxanes and fillers. Suitable fillers for organopolysiloxane containing compositions are well known and include silica, quartz, calcium carbonate and titanium dioxide. Filled organopolysiloxane compositions have very useful characteristics, which make them suitable e.g. for use in the production of rubber compounds. Preferred fillers for use with organopolysiloxanes are silica fillers which may be pretreated in order to provide a hydrophobic surface. It is particularly useful if fillers are required to incorporate untreated silica fillers, as it is believed that such fillers participate in the method of the invention as some sort of co-catalyst.

There now follow a number of examples which illustrate the invention and its usefulness. Parts and percentages are by weight unless otherwise mentioned.

PREPARATION OF CATALYSTS

Catalyst A 2 parts of $NH_4Cl$, 5 parts of $PCl_5$ and 1 part of $AlCl_3$ were mixed together and stirred under a nitrogen blanket at 180° C. for 3 hours in 1,1,2,2, tetrachloroethane as solvent. A white solid was obtained which was soluble in dichloromethane but insoluble in diethyl ether. The reaction product has the average formula $[PCl_3=N-PCl_2=N-PCl_3]+[AlCl_4]^-$.

Catalyst B 0.12 mole of $PCl_5$, 0.08 mole of $NH_4Cl$ and 0.04 mole of $SbCl_5$ were allowed to react together in 60ml of symtetrachloroethane at its refluxing temperature of 147° C. for 3.5 hours. After the reaction the solution was filtered to remove insoluble compounds followed by removal of the solvent under reduced pressure. A bright yellow liquid was obtained which slowly crystallised upon cooling. The resulting catalyst was analysed by NMR (nuclear magnetic resonance) spectroscopy. It was found to be a 50/50 mixture of $[PCl_3=N-PCl_2=N-PCl_3]+[SbCl_6]^-$ and $[PCl_3=N-(PCl_2=N)_2-PCl_3]+[SbCl_6]^-$ while no $[PCl_6]^{-anion}$ was observed.

Catalyst C

The preparation method for Catalyst B was repeated, except that instead of $SbCl_5$ $SbCl_3$ was used. The resulting catalyst was a 50/50 mixture of $[PCl_3=N-PCl_2=N-PCl_3]+[SbCl_4]^-$ and $[PCl_3=N-(PCl_3]+[SbCl_4]^-$.

Catalyst D

The procedure for the preparation of Catalyst B was followed except that after 3 hours the compounds of the formula $[PCl_3=N-PCl_3]+[SbCl_6]^-$, which were insoluble in dichloromethane, were separated. The separated compound was refluxed in sym-tetrachloroethane to yield a pure compound (Catalyst D) of the formula $[PCl_3=N-(PCl_2-PCl_3]+[SbCl_6]^-$.

Catalyst E

The procedure for the preparation of Catalyst B was followed except that the reaction was continued for 8 hours. The resulting catalyst mixture was 35% $[PCl_3=N-PCl_2=N-PCl_3]+[SbCl_6]^-$ and 65% $[PCl_3=N-(PCl_2=N-PCl_3]+[SbCl_6^-$.

Comparative Catalyst A 0.4mole of $PCl_5$ and 2 mole of $NH_4Cl$ were reacted together resulting in a mixture of 75% $[PCl_3=N-PCl_2=N-PCl_3]+[PCl_6]^-$ and 25% $[PCl_3=N-(PCl_2=N)_2-PCl_3]+[PCl_6]^-$.

EXAMPLE 1

When 150ppm of the Catalyst A were added to 1500g of dimethylsilanol endblocked polydimethyl siloxane having a viscosity of 100mm$^2$/s, and the mixture stirred at a reduced pressure of 20 mbar for 15 minutes at room temperature (18° C.), a very high viscosity polydimethylsiloxane was obtained.

EXAMPLE 2

The Catalysts B and C were used in the polymerisation of hydroxyl endblocked polydimethylsiloxanes and were compared with Comparative Catalyst A. 3 batches of 1500g of dimethylsilanol endblocked polydimethylsiloxane having a viscosity at 25° C. of 100mm$^2$/s were dried under reduced pressure for 10 minutes to remove all traces of water. 12ppm of Catalyst B, 12ppm of Catalyst C and 24ppm of Comparative Catalyst A were added respectively to the first, second and third batch of polydimethylsiloxane under stirring. The first batch reached a viscosity of 200,000mm$^2$/s after only 23 minutes, of which the first 20 were an induction period. The second batch had an induction period of 18 minutes and reached a viscosity of 200,000$^2$/s after 21 minutes, whilst the third batch had an induction period of 30 minutes, and did not reach a viscosity of 200,000mm$^2$/s till after 35 minutes.

EXAMPLE 3

This examples shows the improved heat stability of polymers which are prepared by using catalysts according to the invention which are neutralised with amines. The results are compared with stability of polymers prepared with traditional polymerisation catalyst KOH, neutralised with $CO_2$. batches of polydimethylsiloxanes were prepared. Batches 1 and 2 used 35ppm of the Catalyst B at room temperature, while batches 3 and 4 used KOH as a catalyst. Batches 1 and 2 were neutralised with diethylamine upon reaching a viscosity of 41000 and 14000mm$^2$/s respectively. Batches 3 and 4 were neutralised with $CO_2$ after having reached a viscosity of 40800 and 14200mm$^2$/s respectively. All batches were than stored at 160° C. for a period of up to 122 hours and the viscosity was measured. As can be seen in the Table below, the viscosity of Batches 1 and 2 was much more stable than that of Batches 3 and 4.

TABLE

| Time (hours) | Viscosity in mm$^2$/s | | | |
|---|---|---|---|---|
| | Batch 1 | Batch 2 | Batch 3 | Batch 4 |
| 0 | 41,000 | 14,000 | 40,800 | 14,200 |
| 22 | 51,500 | — | 80,000 | 25,500 |
| 29.5 | — | — | 99,000 | 30,700 |
| 45 | 51,500 | — | 300,000 | 73,500 |
| 70 | — | 20,000 | 500,000 | 122,000 |
| 122 | 63,500 | — | — | — |

EXAMPLE 4

40 g of dimethylsilanol endblocked polydimethyl siloxane was mixed with 50 ppm of the Catalyst B and the mixture was reacted at a temperature of 80° C. for 5 minutes, at which time 60 ppm of diethylamine was added to neutralise the catalyst. A viscosity of 300,000 mm$^2$/s was obtained.

EXAMPLE 5

Catalyst D and Catalyst E were each mixed in with 40 g of dimethylsilanol endblocked polydimethyl siloxane at a concentration of 12 ppm and the mixture was reacted at 50° C and a pressure of 20 mbar. The reaction went faster with the Catalyst E showing that the presence of a compound of the formula [PCl$_3$=N—PCl$_2$=N—PCl$_3$]+[SbCl$_6$]− improves the catalytic activity of the catalyst.

EXAMPLE 6

40 g of octamethylcyclotetrasiloxane was loaded to a flask together with 120 ppm of the Catalyst E. After 4 hours of reaction at 140° C. at atmospheric pressure almost 50% of the cyclic siloxane was polymerised into longer chain polydimethylsiloxanes, showing that the catalyst of the invention is also an active rearrangement catalyst.

EXAMPLE 7

3000 g of hydroxyl endblocked polydimethylsiloxane having a viscosity of 100 mm$^2$/s at 25° C. and 300 g of vinyl endblocked polydimethylsiloxane having a viscosity of 450 mm$^2$/s at 25° C. were reacted with 48ppm of Catalyst E at 20° C. under reduced pressure of 20 mm Hg. After 26 minutes a vinyl endblocked polydimethylsiloxane was obtained, having a viscosity at 25° C. of 320,000 mm$^2$/s.

EXAMPLE 8

50 parts of hydroxyl endblocked polydimethylsiloxane having a viscosity at 25° C. of 100 mm$^2$/s and 50 parts of a trimethylsiloxane endblocked polydimethylsiloxane having a viscosity at 25° C. of 50 mm$^2$/s were reacted with 48 ppm of Catalyst E at ambient temperature. The first part of the reaction showed an increase in viscosity due to condensation of silanol groups, and the second part showed a re-equilibration, yielding a final polydimethyl siloxane polymer with a viscosity of 400 mm$^2$/s and a residual 4% of the polymers having silanol groups.

EXAMPLE 9

70 parts of hydroxyl endblocked polydimethylsiloxane having a viscosity at 25° C. of 100 mm$^2$/s and 30 parts of a trimethylsiloxane endblocked polydimethylsiloxane having a viscosity at 25° C. of 100 mm$^2$/s were reacted with 48 ppm of Catalyst E at ambient temperature. The first part of the reaction showed an increase in viscosity, due to condensation of silanol groups, and the second part showed a re-equilibration yielding a final polydimethylsiloxane polymer with a viscosity of 1000 mm$^2$/s and 5% of cyclosiloxanes.

EXAMPLE 10

When trimethylsiloxane endblocked polydimethylsiloxane having a viscosity of 5000 mm$^2$/s was equilibrated at 140° C. with 120 ppm of Catalyst B no change in viscosity was observed, due to the fact that the starting material was already an equilibrated compound.

EXAMPLE 11

40 kg of hydroxyl endblocked polydimethylsiloxane having a viscosity at 25° C. of 100 mm$^2$/s and 50 ppm of Catalyst E was reacted at 100° C. for 5 minutes under a reduced pressure (20 mm Hg), at which time the catalyst was neutralised with 60 ppm of diethylamine. The final polymer had a viscosity at 25° C. of 300,000 mm$^2$/s.

EXAMPLE 12

35kg of hydroxyl endblocked polydimethylsiloxane having a viscosity at 25° C. of 100mm$^2$/s and 35 ppm of Catalyst E was reacted at 100° C. for 5 minutes under a reduced pressure (20 mm Hg), at which time the catalyst was neutralised with 40 ppm of diethylamine. The final polymer was a clear heat stable polymer with a viscosity at 25° C. of 43,000 mm$^2$/s and less than 1% cyclic siloxanes present.

EXAMPLE 13

1920 g of hydroxyl endblocked polydimethylsiloxane having a viscosity of 25° C. of 100 mm$^2$/s, 1.22 g of a hydroxyl endblocked vinylmethyldecasiloxane, 2.8 g of a vinyl end-blocked dimethylpolysiloxane having about 8% by weight vinyl groups in the polymer and 48 ppm of Catalyst E were reacted at 22° C. for 1 hour under a reduced pressure (20 mmHg) to give a vinylmethyl dimethyl copolymer having a viscosity of 3100 mm$^2$/s, with a stability measured by thermogravimetric analysis of about 600° C.

EXAMPLE 14

1890 g of hydroxyl endblocked polydimethylsiloxane having a viscosity of 100 mm$^2$/s at 25° C., 0.71g of a hydroxyl endblocked vinylmethyltetrasiloxane, 2.8 g of a vinyl end-blocked dimethylpolysiloxane having about 8% by weight vinyl groups and 48 ppm of Catalyst E were reacted at 50° C. for 20 minutes under a reduced pressure (20 mmHg) to give a vinylmethyl dimethyl copolymer having a viscosity of 2500 mm$^2$/s. After aging the polymer for 24 hours at 160° C., no changes in viscosity had occured.

That which is claimed is:

1. A method of making organopolysiloxanes which comprises contacting one or more organosilicon compounds having at least one unit of the general formula $$R_a°SiO_{\frac{4-a}{2}},$$

wherein R° is selected from a hydrogen atom, a hydroxyl group, a hydrocarbon group having from 1 to 18 carbon atoms, a substituted hydrocarbon group having from 1 to 18 carbon atoms or a hydrocarbonoxy group having up to 18 carbon atoms and a has a value of from 0 to 4 with a phosphonitrile halide which has the general formula AB, wherein A is a phosphonitrile halide cation of the general formula [X(PX$_2$=N)$_n$PX$_3$]+, wherein X denotes a halide atom and n has a value of from 1 to 8 and B is an anion derived from a Lewis acid not containing a P atom.

2. A method according to claim 1 wherein the organosilicon compounds are linear organosiloxane polymers.

3. A method according to claim 1, wherein at least 80% of all R° groups in the organosilicon compounds are selected from methyl or phenyl groups.

4. A method according to claim 1 in which the phosphonitrile halide catalyst has the general formula [X(PX$_2$=N)$_n$PX$_3$]+[MX$_{(v−t+1)}$R$^2$$_t$]−wherein X denotes a halide atom, M is an element having an electronegativity on Pauling's scale of from 1.0 to 2.0, R$^2$ is an alkyl group having up to 12 carbon atoms, n is an integer with a value of from 1 to 8, v is the valence or oxidation state of M and 0<t<v.

5. A method according to claim 4 wherein the phosphonitrile halide catalyst each X denotes a chlorine atom.

6. A method according to claim 1 wherein the value of n in the phosphonitrile halide catalyst is from 2 to 4.

7. A method according to claim 4 wherein the value of n in the phosphonitrile halide catalyst is from 2 to 4.

8. A method according to claim 1 wherein the value of t in the phosphonitrile halide catalyst is zero.

9. A method according to claim 1 wherein the anion contains an element M in the phosphonitrile halide catalyst and is selected to have an electronegativity value according to Pauling's scale of from 1.2 to 1.9.

10. A method according to claim 4 wherein M in the phosphonitrile halide catalyst is selected to have an electronegativity value according to Pauling's scale of from 1.2 to 1.9.

11. A method according to claim 1 wherein the anion contains an element M in the phosphonitrile halide catalyst and is selected to maximise the difference in electronegativity value according to Pauling's scale between the phophorus atom of part A of the catalyst and M.

12. A method according to claim 1 wherein the phosphonitrile halide catalyst is present in a ratio of from 1 to 500 ppm by weight based on the weight of the organosilicon compounds.

13. A method according to claim 4 wherein the phosphonitrile halide catalyst is present in a ratio of from 1 to 500ppm by weight based on the weight of the organosilicon compounds.

14. A method according to claim 1 wherein the phosphonitrile halide catalyst is present in a ratio of from 5 to 50 ppm by weight based on the weight of the organosilicon compounds.

15. A method according to claim 4 wherein the phosphonitrile halide catalyst is used in a ratio of from 5 to 50 ppm by weight based on the weight of the organosilicon compounds.

16. A method according to claim 1 which also comprises the neutralisation of the phosphonitrile halide catalyst with an alkaline material after the organosiloxanes have been made.

17. A method according to claim 4 which also comprises the neutralisation of the phosphonitrile halide catalyst with an alkaline material after the organosiloxanes have been made.

18. A method of making organopolysiloxane having the general formula $R°(R^1_2SiO)_pSiR^1_2R°$, wherein $R°$ is selected from a hydrogen atom, a hydroxyl group, a hydrocarbon group having from 1 to 18 carbon atoms, a substituted hydrocarbon group having from 1 to 18 carbon atoms or a hydrocarbonoxy group having up to 18 carbon atoms, R1 denotes the same groups as $R°$ except for hydroxyl groups and p is an integer, which comprises contacting one or more organosilicon compounds of the general formula $HO-(R^1_2SiO)_q-H$, wherein R1 is as defined above, q denotes an integer which is substantially smaller than p with a phosphonitrile halide which has the general formula AB, wherein A is a phosphonitrile halide cation of the general formula $\{X(PX_2=N)_nPX_3\}+$, wherein X denotes a halide atom and n has a value of from 1 to 8, and B is an anion derived from a Lewis acid not containing a P atom.

19. A method of making organopolysiloxanes having the general formula $R^1(R^1_2SiO)_pSiR^1_2R^1$, wherein R1 denotes a hydrogen atom, a hydrocarbon group having from 1 to 18 carbon atoms or a hydrocarbonoxy group having up to 18 carbon atoms, and p is an integer, which comprises contacting one or more organosilicon compounds of the general formula $R^1(R^1_2SiO)_qSiR^1_3$ and/or organosilicon compounds of the general formula $(R^1_2SiO)_S$, wherein R1 is as defined above and s denotes an integer with a value of from 3 to about 10 and q denotes an integer which is substantially smaller than p with a phosphonitrile halide which has the general formula AB, wherein A is a phosphonitrile halide cation of the general formula $\{X(PX_2=N)_nPX_3\}+$, wherein X denotes a halide atom and n has a value of from 1 to 8, and B is an anion derived from a Lewis acid not containing a P atom.

20. A method according to claim 18 wherein organopolysiloxanes are made wherein each $R°$ denotes a group $R^1$, which includes adding reagents which act as endblockers for the organopolysiloxanes.

21. A method according to claim 18 wherein there are also present with the organosilicon compounds silica filler materials for the organopolysiloxanes.

* * * * *